(12) United States Patent
Silva

(10) Patent No.: US 8,378,538 B2
(45) Date of Patent: Feb. 19, 2013

(54) DC MOTOR WITH A LEADTHROUGH CAPACITOR

(75) Inventor: Fernando Silva, Vinhedo (BR)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 12/596,573

(22) PCT Filed: Mar. 20, 2008

(86) PCT No.: PCT/EP2008/053395
§ 371 (c)(1),
(2), (4) Date: Feb. 4, 2010

(87) PCT Pub. No.: WO2008/128838
PCT Pub. Date: Oct. 30, 2008

(65) Prior Publication Data
US 2010/0141068 A1    Jun. 10, 2010

(30) Foreign Application Priority Data
Apr. 19, 2007    (DE) .......................... 10 2007 018 462

(51) Int. Cl.
*H02K 11/00*    (2006.01)
*H02K 11/02*    (2006.01)
(52) U.S. Cl. .............. 310/72; 310/71; 310/68 R; 310/51
(58) Field of Classification Search .................... 310/72, 310/71, 68 R, 51
See application file for complete search history.

(56) References Cited

U.S. PATENT DOCUMENTS

| | | | | |
|---|---|---|---|---|
| 2,015,667 A | * | 10/1935 | Fleming et al. | 310/72 |
| 4,384,223 A | * | 5/1983 | Zelt | 310/68 R |
| 4,727,274 A | * | 2/1988 | Adam et al. | 310/239 |
| 4,900,966 A | * | 2/1990 | Winter et al. | 310/239 |
| 5,734,212 A | * | 3/1998 | Uffelman | 310/51 |
| 6,768,243 B1 | * | 7/2004 | Yamazaki et al. | 310/239 |
| 6,982,512 B2 | * | 1/2006 | Schuster et al. | 310/148 |
| 7,018,240 B2 | * | 3/2006 | Bourdykina et al. | 439/620.02 |
| 7,843,105 B2 | * | 11/2010 | Grimm et al. | 310/239 |
| 2003/0007297 A1 | * | 1/2003 | Herrmann et al. | 361/23 |

(Continued)

FOREIGN PATENT DOCUMENTS

| | | |
|---|---|---|
| DE | 10349301 A1 | 6/2004 |
| DE | 102004046299 A1 | 3/2006 |

(Continued)

OTHER PUBLICATIONS

Translation of Foreign document DE 102004046299 A1, published 2006.*

*Primary Examiner* — Quyen Leung
*Assistant Examiner* — Alex W Mok
(74) *Attorney, Agent, or Firm* — Michael Best & Friedrich LLP

(57) ABSTRACT

The invention relates to a DC motor, particularly for a fan device of a motor vehicle, having a stator and a metal grounding plate arranged on the stator, for receiving at least one leadthrough capacitor of an interference suppressor device. The capacitor being arranged in a connection line of the motor. According to the invention, the leadthrough capacitor includes a metal housing with at least one contact section for contacting the stator and/or the metal grounding plate. Thus, a compact interference suppressor device, which can be produced in a cost-effective way and is easy to install, is achieved.

12 Claims, 5 Drawing Sheets

U.S. PATENT DOCUMENTS

| | | | |
|---|---|---|---|
| 2006/0028076 A1* | 2/2006 | Uchida et al. | 310/68 R |
| 2006/0113850 A1 | 6/2006 | Togashi | |
| 2006/0244321 A1* | 11/2006 | Mizutani | 310/68 R |
| 2007/0170789 A1* | 7/2007 | Kawarai et al. | 310/51 |
| 2007/0278877 A1* | 12/2007 | Winkler et al. | 310/72 |
| 2008/0048507 A1* | 2/2008 | Kanda et al. | 310/42 |

FOREIGN PATENT DOCUMENTS

| | | |
|---|---|---|
| EP | 1670123 A2 | 6/2006 |

* cited by examiner

DC MOTOR WITH A LEADTHROUGH CAPACITOR

CROSS-REFERENCE TO RELATED APPLICATION

This application is a 35 USC 371 application of PCT/EP2008/053395 filed on Mar. 20, 2008.

BACKGROUND OF THE INVENTION

1. Field of the Invention

The invention is based on a direct current motor, in particular a direct current motor for driving a blower of a motor vehicle.

2. Description of the Prior Art

A direct current motor is known from German Patent Disclosure DE 10 2004 046 299 A1. The motor described there has a stator with an opening for the leadthrough of electrical connection lines to the motor brushes, and in the region of the recess in the stator there is an interference suppressor for reducing and/or eliminating line interference signals. Part of this interference suppressor is a leadthrough capacitor, which is disposed in an electrical path of at least one connection line and is secured to a ground plate seated in the recess in the stator. This known arrangement is said to be improved with regard to its interference suppression effect.

ADVANTAGES AND SUMMARY OF THE INVENTION

The proposed design of the direct current motor with the characteristics of claim 1 has the advantage in particular that because of the improved design of the contact, close to the metal housing of the leadthrough capacitor and with a disposition of the ground plate in good electrical contact with the stator of the motor, the interference suppression of the motor is markedly improved. It is expedient if the housing of the leadthrough capacitor is embodied cylindrically, because then uniform ground contact can be attained in an especially simple way over the entire outer circumference of the capacitor.

Preferably, the housing of the leadthrough capacitor has a contact flange with contact portions disposed symmetrically to the leadthrough axis of the capacitor, and the associated connection line of the motor extends in the leadthrough axis. It is especially expedient for optimal interference suppression if a circular-annular contact flange of a cylindrical housing of the leadthrough capacitor has contact portions disposed concentrically with the leadthrough axis, so that the ground contacts of the capacitor housing surround the connection line at the same spacing. However, to make the sheet-metal cuts easier, it is also alternatively possible to choose a square or rectangular shape for the capacitor housing and the contact flange.

With respect to mounting the ground plate on the stator of the motor, it is advantageous if the ground plate fits over the stator with an essentially U-shaped peripheral portion and this peripheral portion is preferably pressed against the stator by a bearing plate of the motor, thereby ensuring secure locking and good electrical contact between the ground plate and the stator.

Further details and advantageous features of the invention will become apparent from the description of an exemplary embodiment of the invention.

BRIEF DESCRIPTION OF THE DRAWINGS

The invention will be described in further detail below in conjunction with the drawings, in which.

DESCRIPTION OF THE PREFERRED EMBODIMENT

Figure 1:
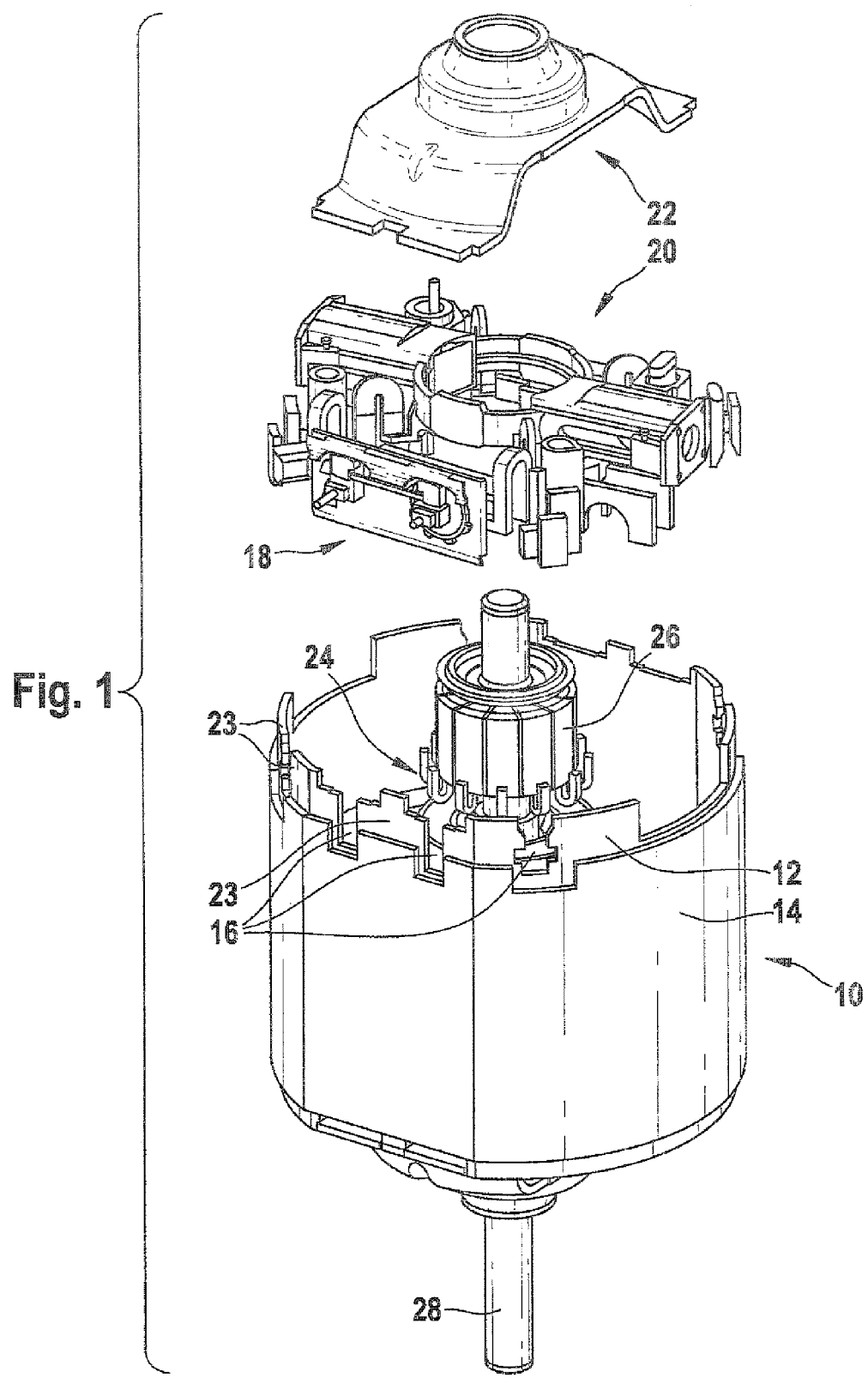
FIG. 1 is an exploded view of the direct current motor of the invention.
Figure 4:
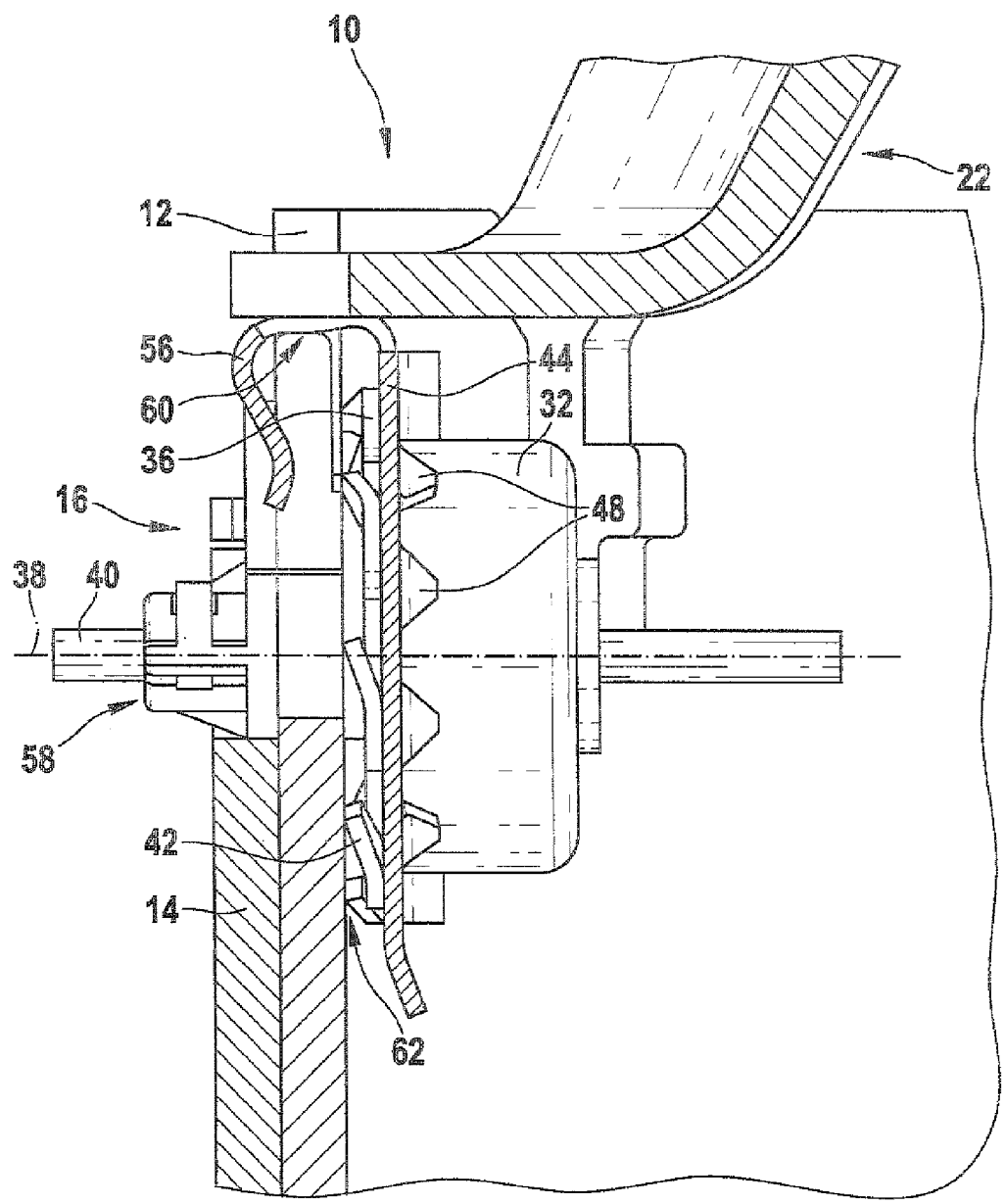
FIG. 4 shows a fragmentary section through the stator of a direct current motor having a leadthrough arrangement with a ground plate which carries a capacitor and is locked by a bearing plate of the motor and contacted with the stator.

In FIG. 4, reference numeral 10 indicates a stator of a direct current motor of the kind used for instance for heater or air conditioning blowers in motor vehicles. The stator 10 is embodied in two layers, with an inner housing plate 12 and an outer housing plate 14 that are permanently joined together, for instance welded together. In the stator, recesses 16 are provided for the leadthrough of connection lines 40 and 52, which are not shown in FIG. 1.

An interference suppressor 18 is placed in the region of the recesses 16 in the stator 10 and is held during mounting on a brush holder 20. Securing the brush holder 20 with the interference suppressor 18 in the stator is done by means of a bearing plate 22, which is permanently locked by calking in the region of protrusions 23 on the stator 10 and in so doing positions and contacts the interference suppressor 18 in the region of the recesses 16 of the stator. A rotor 24 with a collector 26 and a power takeoff shaft 28 is disposed in the stator 10 and drives a blower, not shown, of a motor vehicle.

Figure 2:
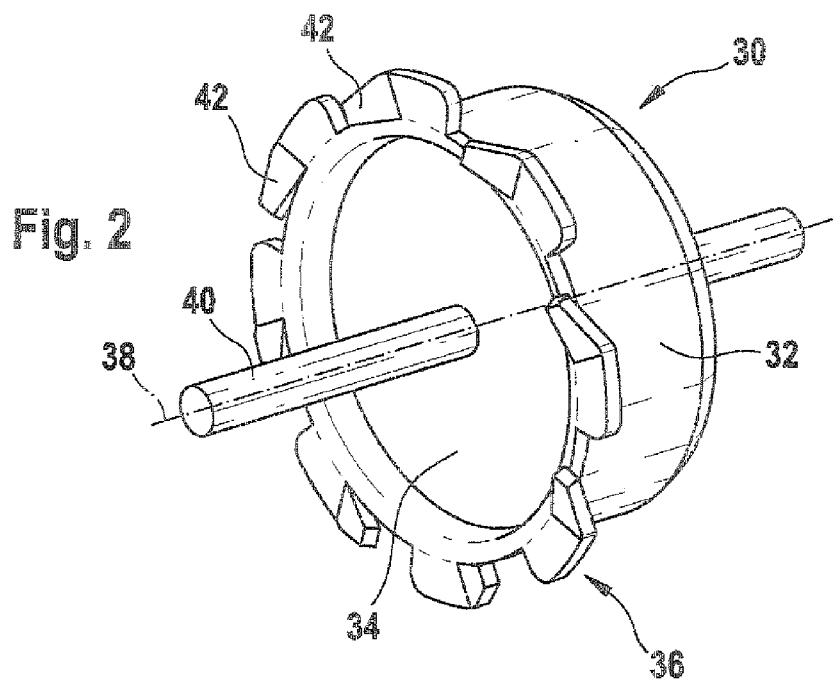
FIG. 2 is a perspective view of a leadthrough capacitor designed according to the invention.

FIG. 2 in an enlarged perspective view shows a leadthrough capacitor 30 of the interference suppressor 18, with a cylindrical, cup-shaped housing 32. The term leadthrough capacitor stands here for a plurality of capacitor elements which are interconnected on a printed circuit board and embedded in a potting composition 34. The potting composition may be omitted if the housing is sealed off in some other way. The housing 32 of the capacitor 30 has an essentially circular-annular contact flange 36, which is disposed concentrically to the leadthrough axis 38. The connection line 40 to the positive pole, not shown, of the direct voltage supply of the motor is located in the leadthrough axis 38. The contact flange 36 is subdivided into individual contact portions 42, which each have tabs, bent at an angle to the housing, for contacting the stator 10.

Figure 3:
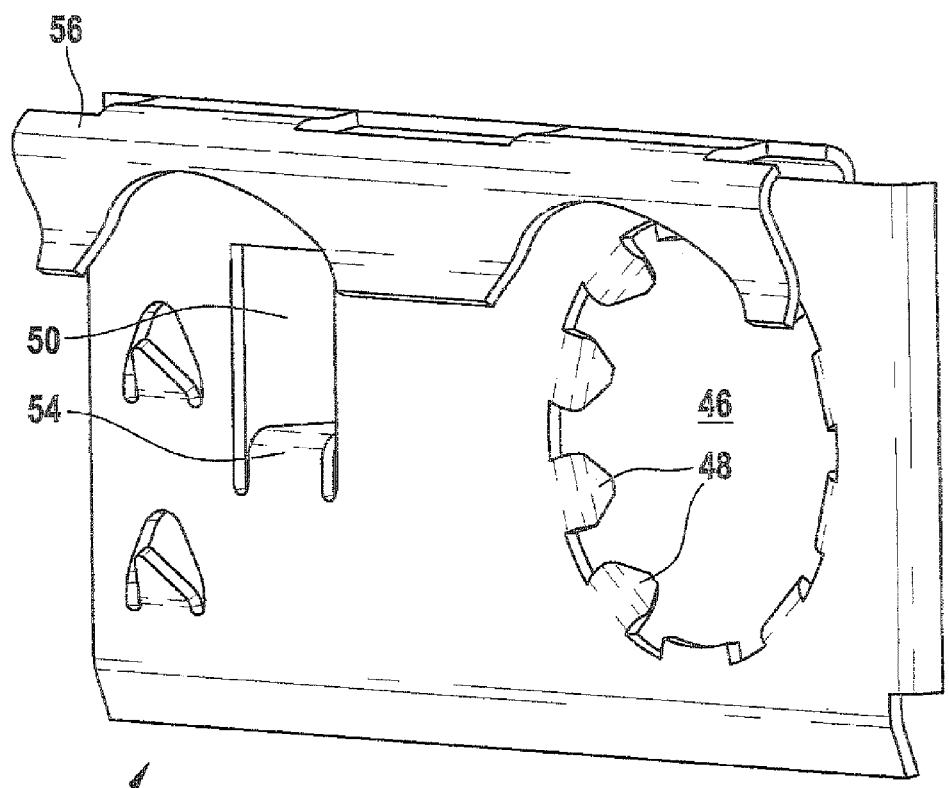
FIG. 3 is a perspective view of a ground plate for holding and contacting a leadthrough capacitor and a further connection line to the motor.

FIG. 3 shows a ground plate 44 with a first opening 46 for receiving the leadthrough capacitor 30 disposed in the connection line 40. The housing 32 of the capacitor is locked, centered and contacted between identical contact tongues 48 that protrude from the circumference of the opening 46. The contact tongues 48 are distributed uniformly and symmetrically to the leadthrough axis 38 of the capacitor 30 and of its housing 32 on the circumference of the opening 46. Extending through a second opening 50 in the ground plate 44 is a negative line, not shown in FIG. 3, as a second connection line of the motor, the negative line being connected to ground. This line is secured by clamping for example and electrically contacted at a holding lip 54 of the ground plate 44. Instead of the second opening 50, however, to improve the interference suppression effect, a second opening in the version like the opening 46 may be provided, with a further capacitor 30.

Above the openings 46 and 50, the ground plate 44 has a peripheral portion 56, bent essentially in the shape of a U, with which it fits over the stator 10 and is electrically contacted with it, as will be described and explained in further detail below.

FIG. 4 shows a fragmentary section through the stator 10 of the direct current motor and through the interference suppressor 18. It can be seen clearly in this view how the contact portions 42, protruding symmetrically and uniformly from the contact flange 36, rest on the inner housing plate 12 of the stator 10 and thus establish a secure ground connection from the housing 32 of the capacitor 30 to the stator. The electrical contacting is effected symmetrically here and concentrically to the connection line 40, thus optimizing the interference suppression effect. The contact between the ground plate 44 and the stator 10 is ensured by pressing the bearing plate 22 against the middle part of the U-shaped peripheral portion 56 of the ground plate 44.

In FIG. 4, an insulation mount 58 is also shown, which surrounds the connection line 40 and is fixed on the one hand in the U-shaped peripheral portion 56 of the ground plate 44 and on the other in the recesses 16 of the stator 10. By means of this insulation mount 58, the location of the connection lines 40 and 52 (FIG. 5) is defined, and the insulation of the lines in the leadthrough region is ensured, optionally including if flexible pigtail cables for the connection lines are used. The use of pigtail cables for connecting the carbon brushes and the use of flexible connection lines 40, 52 also lessens the transmission of noise from the motor to the outside.

Figure 5:
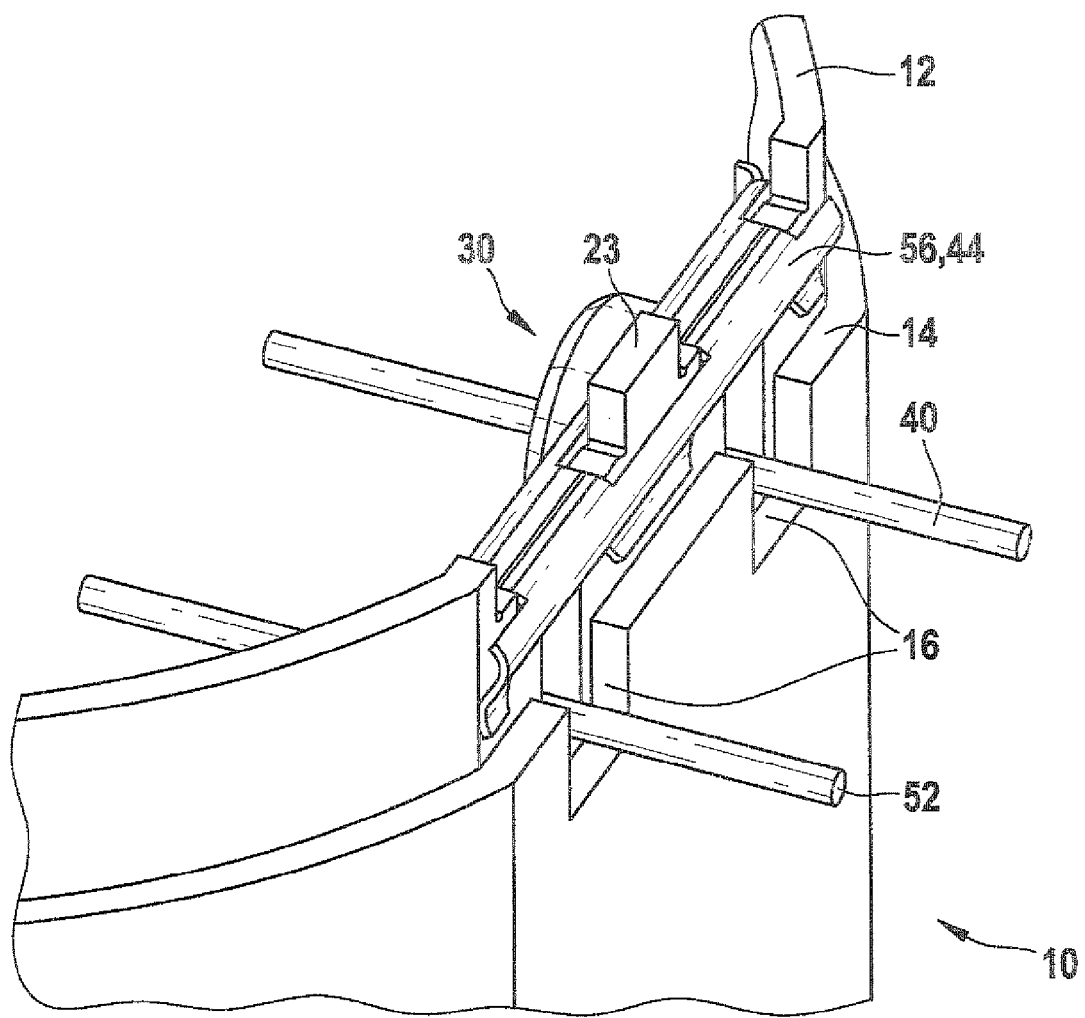
FIG. 5 shows a fragmentary view of the stator of the direct current motor with the interference suppressor inserted.

FIG. 5 in a schematic view shows a part of the stator 10 with the inner housing plate 12, the outer housing plate 14, and the ground plate 44 that fits over the inner housing plate 12 with its U-shaped peripheral portion 56. The connection lines 40 and 52 are shown without the insulation mount 58. The alignment and positioning of the ground plate 44 is effected by means of the upward-protruding protrusion 23 of the inner housing plate 12, which after the bearing plate 22 is placed on top and calked ensures the secure locking and contacting of the ground plate 44 at the support point 60 and of the interference suppressor 18 in the stator 10.

Figure 6:
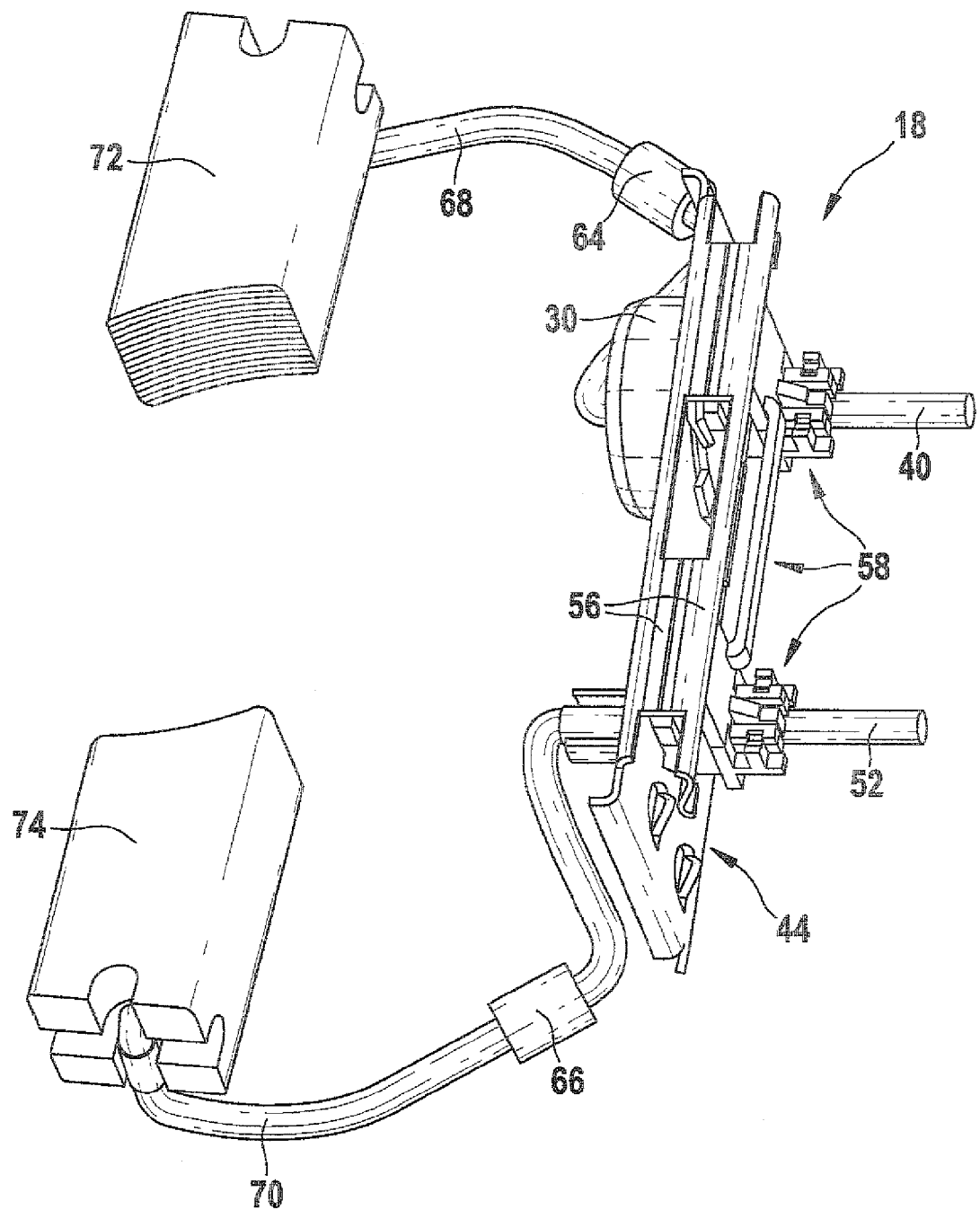
FIG. 6 is a view of the interference suppressor of the motor with the connection lines to the motor brushes.

FIG. 6, in a further perspective view, shows the interference suppressor 18 with the positive connection line 40 and the negative connection line 52, which are secured in a position and alignment in the region of the recess 16 in the stator by the insulation mount 58. The connection lines 40 and 52 in this version are connected inside the motor to lead lines 68 and 70 to the brushes 72 and 74 by means of clamping bushes 64 and 66. In this way, for the outer connection lines 40 and 52 on the one hand and for the lead lines 68 and 70 to the motor brushes on the other, different lead line types can be selected, in particular pigtail-like lead lines 68 and 70 to the brushes and solid connection wires for the outer connection lines of the motor. Otherwise, the arrangement in FIG. 6 corresponds to the embodiment in the foregoing views.

By the design according to the invention of the interference suppressor 18 of a direct current motor, on the one hand the expense for interference suppression of the motor can be reduced markedly, and on the other, the quality of interference suppression can be markedly improved, in particular with respect to high interference frequencies. The interference suppression chokes and capacitors in known interference suppressors of direct current motors can be eliminated and the effort and expense for wiring and mounting can be reduced markedly, thus lowering the total system costs for producing the motor while the interference suppression stays the same or is improved, and making it possible to meet increasingly stringent demands for electromagnetic compatibility. Moreover, the proposed new interference suppression module can be achieved using commercially available components that are modified only slightly, making overall production and assembly less expensive, and good interference suppression can be achieved up to frequencies on the order of magnitude of 2 GHz, which occur particularly in mobile telephones.

In addition, by means of the provisions of the invention, tension relief for the connection lines 40 and 52 can be attained at no additional expense. With different models and sizes of motor, the design of the ground plate 44 is easily adaptable to the motor model without changing the other components of the interference suppressor 18, and the ground plate 44 covers the recesses 16 in the stator 10 essentially without gaps and thus also improves the interference suppression with respect to interference other than line interference.

The foregoing relates to the preferred exemplary embodiment of the invention, it being understood that other variants and embodiments thereof are possible within the spirit and scope of the invention, the latter being defined by the appended claims.

The invention claimed is:

1. A direct current motor, having a stator and a ground plate disposed on the stator, the ground plate having an opening for receiving at least one leadthrough capacitor of an interference suppressor, the leadthrough capacitor disposed in a connection line of the motor, wherein the leadthrough capacitor has a metal housing having at least one contact flange with one or more contact portions for making electrical contact with the ground plate, and wherein the contact flange is locked, centered, and electrically contacted in the opening in the ground plate by means of contact tongues protruding symmetrically from the edge of the opening, and wherein the contact portions are disposed on the contact flange, symmetrically to the leadthrough axis of the capacitor, and wherein the contact portions are embodied as tabs bent at an angle from the contact flange.

2. The direct current motor as defined by claim 1, wherein the housing of the leadthrough capacitor is embodied cylindrically.

3. The direct current motor as defined by claim 2, wherein a circular-annular contact flange of a cylindrical housing of the leadthrough capacitor has contact portions disposed concentrically to the leadthrough axis.

4. The direct current motor as defined by claim 1, wherein the ground plate fits over the stator with an essentially U-shaped peripheral portion.

5. The direct current motor as defined by claim 1, wherein a peripheral portion of the ground plate is pressed against the stator by a bearing plate of the motor.

6. The direct current motor as defined by claim 1, wherein a leadthrough capacitor inserted into the connection line of the motor is disposed in a first opening in the ground plate, and a ground line of the motor is disposed in a second opening in the ground plate, and the ground line is contacted mechanically and electrically to the ground plate in the region of the second opening.

7. The direct current motor as defined by claim 1, wherein an insulation mount for at least one connection line of the motor is associated with at least one opening in the ground plate.

8. The direct current motor as defined by claim 1, wherein the motor is for a blower of a motor vehicle.

9. A direct current motor, having a stator and a ground plate disposed on the stator, the ground plate receiving at least one leadthrough capacitor of an interference suppressor, the leadthrough capacitor disposed in a connection line of the motor, wherein the leadthrough capacitor has a metal housing, with one or more contact portions for making electrical contact with the stator and/or the ground plate wherein the leadthrough capacitor with its housing is locked, centered and electrically contacted in an opening in the ground plate by means of contact tongues protruding symmetrically from the periphery of the opening, and wherein the contact portions are disposed on a housing flange of the leadthrough capacitor, symmetrically to the leadthrough axis of the capacitor, and wherein the contact portions are embodied as tabs bent at an angle from the housing flange of the leadthrough capacitor.

10. The direct current motor as defined by claim 9, wherein the housing of the leadthrough capacitor has a contact flange.

11. The direct current motor as defined by claim 9, wherein a circular-annular contact flange of a cylindrical housing of the leadthrough capacitor has contact portions disposed concentrically to the leadthrough axis.

12. The direct current motor as defined by claim 9, wherein the motor is for a blower of a motor vehicle.

* * * * *

UNITED STATES PATENT AND TRADEMARK OFFICE
CERTIFICATE OF CORRECTION

PATENT NO. : 8,378,538 B2  Page 1 of 1
APPLICATION NO. : 12/596573
DATED : February 19, 2013
INVENTOR(S) : Fernando Silva It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 474 days.

Signed and Sealed this
First Day of September, 2015

Michelle K. Lee
*Director of the United States Patent and Trademark Office*